(12) United States Patent
Bourgeois et al.

(10) Patent No.: US 9,174,696 B2
(45) Date of Patent: Nov. 3, 2015

(54) GRIP FOR HANDLEBARS OF A BICYCLE AND SIMILAR VEHICLE AND METHOD THEREFORE

(75) Inventors: Vincent Bourgeois, Bassano del Grappa (IT); Stefano Segato, Vincenza (IT); Matteo Mason, Limena (IT)

(73) Assignee: SELLE ROYAL S.P.A., Pozzoleone (Vicenza) (IT)

( * ) Notice: Subject to any disclaimer, the term of this patent is extended or adjusted under 35 U.S.C. 154(b) by 0 days.

(21) Appl. No.: 13/636,301

(22) PCT Filed: Feb. 10, 2011

(86) PCT No.: PCT/IB2011/050569
§ 371 (c)(1),
(2), (4) Date: Sep. 20, 2012

(87) PCT Pub. No.: WO2011/117760
PCT Pub. Date: Sep. 29, 2011

(65) Prior Publication Data
US 2013/0000441 A1    Jan. 3, 2013

(30) Foreign Application Priority Data

Mar. 24, 2010  (IT) .............................. VR2010A0057

(51) Int. Cl.
*B62K 21/26*        (2006.01)
(52) U.S. Cl.
CPC ........... *B62K 21/26* (2013.01); *Y10T 74/20828* (2015.01)

(58) Field of Classification Search
CPC ........ B62K 21/26; B62K 23/00; B62K 23/02; B62M 25/04; B25G 1/102; B25J 13/02; A63B 59/0014
USPC .......................... 74/551.9, 558.5; 16/421, 430
See application file for complete search history.

(56) References Cited

U.S. PATENT DOCUMENTS

| | | | | |
|---|---|---|---|---|
| 412,479 | A * | 10/1889 | David | 264/271.1 |
| 4,785,495 | A * | 11/1988 | Dellis | 16/421 |
| 5,155,878 | A | 10/1992 | Dellis | |
| 5,846,629 | A * | 12/1998 | Gwinn | 428/68 |
| 6,421,879 | B1 * | 7/2002 | Gratz et al. | 16/422 |
| 6,968,599 | B2 * | 11/2005 | Blauer et al. | 16/431 |
| 2006/0174450 | A1 * | 8/2006 | Chen | 16/436 |
| 2007/0157758 | A1 | 7/2007 | Shih | |

FOREIGN PATENT DOCUMENTS

| | | |
|---|---|---|
| DE | 202008004422 | 5/2008 |
| EP | 1726411 | 11/2006 |
| FR | 2711350 | 4/1995 |
| GB | 2263248 | 7/1993 |
| WO | WO02081294 | 10/2002 |
| WO | WO2005021366 | 3/2005 |

* cited by examiner

*Primary Examiner* — Vicky Johnson
(74) *Attorney, Agent, or Firm* — Tutunjian & Bitetto, P.C.

(57) ABSTRACT

A grip includes a substantially tubular body equipped with ends and having a substantially cylindrical cavity with a longitudinal axis (X), the body being able to be fitted on an end of the handlebars, a padding associated with the body, a cover positioned above the padding, means for fastening the grip to the handlebars, the cover including a thermoshrinking and/or thermoformable material, so that, following a heating and/or cooling, the cover takes the form of the padding.

25 Claims, 5 Drawing Sheets

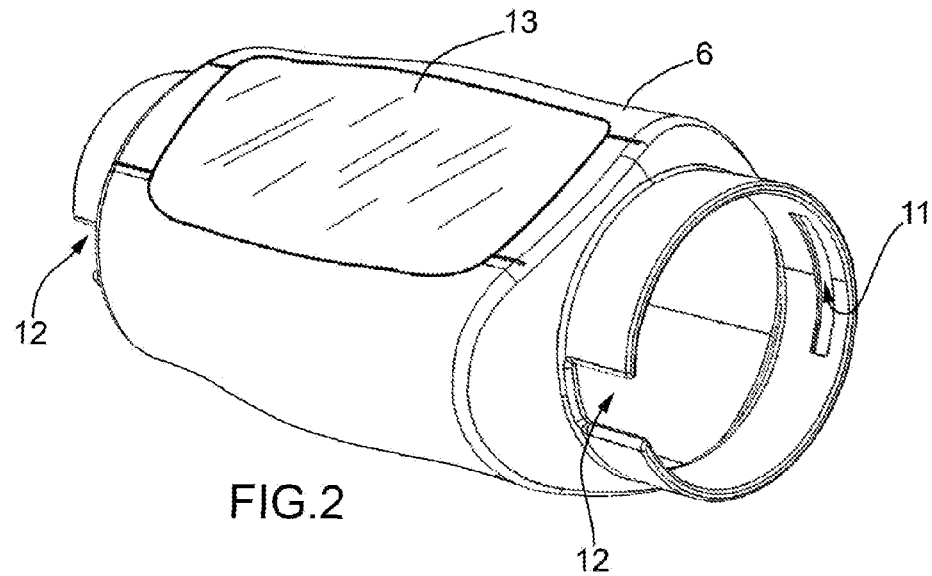
FIG.2
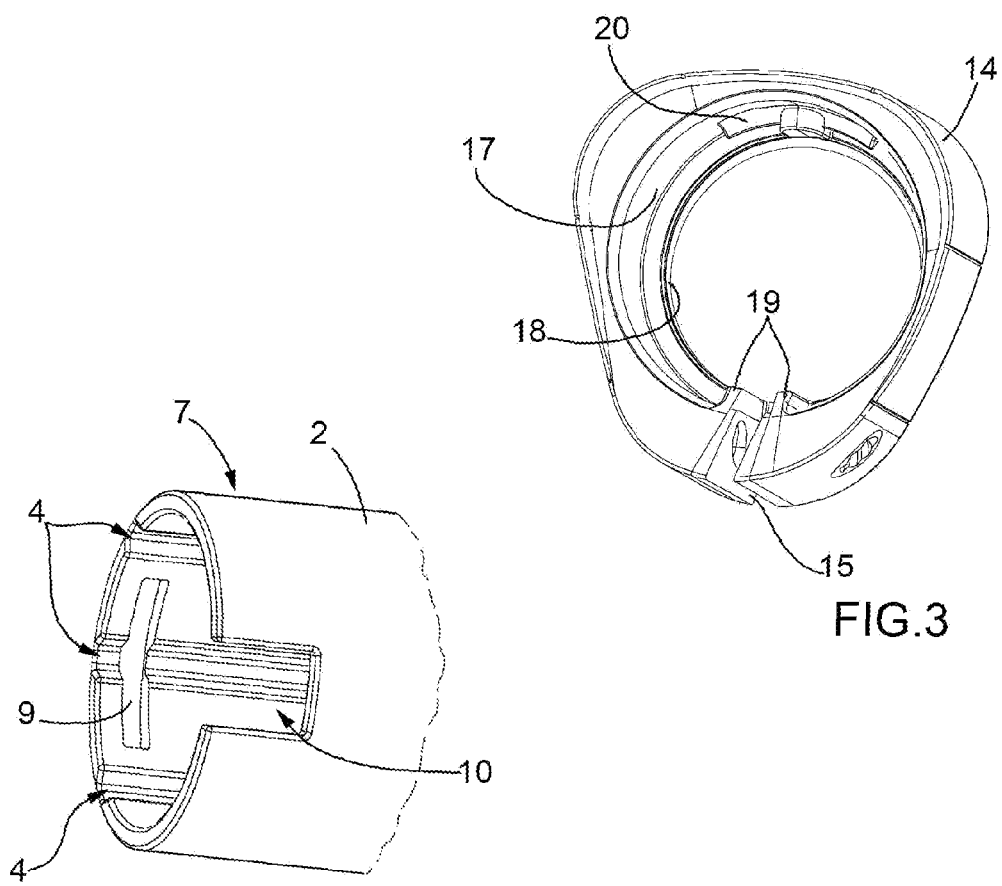
FIG.3
FIG.4

GRIP FOR HANDLEBARS OF A BICYCLE AND SIMILAR VEHICLE AND METHOD THEREFORE

TECHNICAL FIELD

The present invention concerns a grip for handlebars of a bicycle, and similar vehicles equipped with handlebars, for example motorcycles, delivery tricars, etc. In general, in addition to the handlebars of the vehicles, the present invention concerns a grip for any kind of hand grips and handles, for example even for sports equipment.

The present invention also concerns a method to obtain the aforementioned grip.

DESCRIPTION OF RELATED ART

A grip for handlebars of a bicycle is for example known in European patent EP-1373058 B1 to the same Applicant.

Such a grip essentially comprises a main rigid body suitable for being inserted on handlebars and a cover of relatively soft material, for example an elastomeric material of the gel type, with a profile that is suitably shaped for the user to hold and that is equipped with grooves so as to promote aeration of the hand. In the grip according to such a patent, it is also foreseen for there to be some terminal elements with tubular-shaped lugs equipped with surfaces suitable for engaging on the handlebars.

SUMMARY OF THE INVENTION

One purpose of the invention is to improve the state of the art.

Another purpose of the present invention is to provide a grip for handlebars that is more comfortable than grips of the prior art, i.e. having a better shock and vibration absorption, and a better distribution of the pressure at the interface with the user.

Another purpose of the present invention is to provide a grip for handlebars having a simple structure and that is cost-effective.

Another purpose of the invention is to provide a grip for handlebars that makes it possible to obtain a secure fastening to the handlebars.

A further purpose of the present invention is to provide a grip that is more weather resistant with respect to grips of the state of the art and that has a great flexibility of production in terms of combinations of possible colors, designs, shapes, etc.

In accordance with one aspect of the present invention, these purposes are achieved with a grip for handlebars according to an aspect of the present invention.

These and other purposes are achieved by preferred and advantageous embodiments of the invention.

Yet another purpose of the present invention is to provide a method for making said grip for handlebars.

A further purpose of the present invention is to provide a method for making a grip for handlebars.

BRIEF DESCRIPTION OF THE DRAWINGS

Further characteristics and advantages of the invention shall become clearer from the detailed description of a grip for handlebars, illustrated as an indication and not for limiting purposes in the attached drawings in which:

FIG. 2 is a perspective view of an outer cover of another version of the grip for handlebars according to the present invention;

FIGS. 3 and 4 illustrate some enlarged details of the grips according to the previous figures;

DETAILED DESCRIPTION OF PREFERRED EMBODIMENTS

Figure 1:
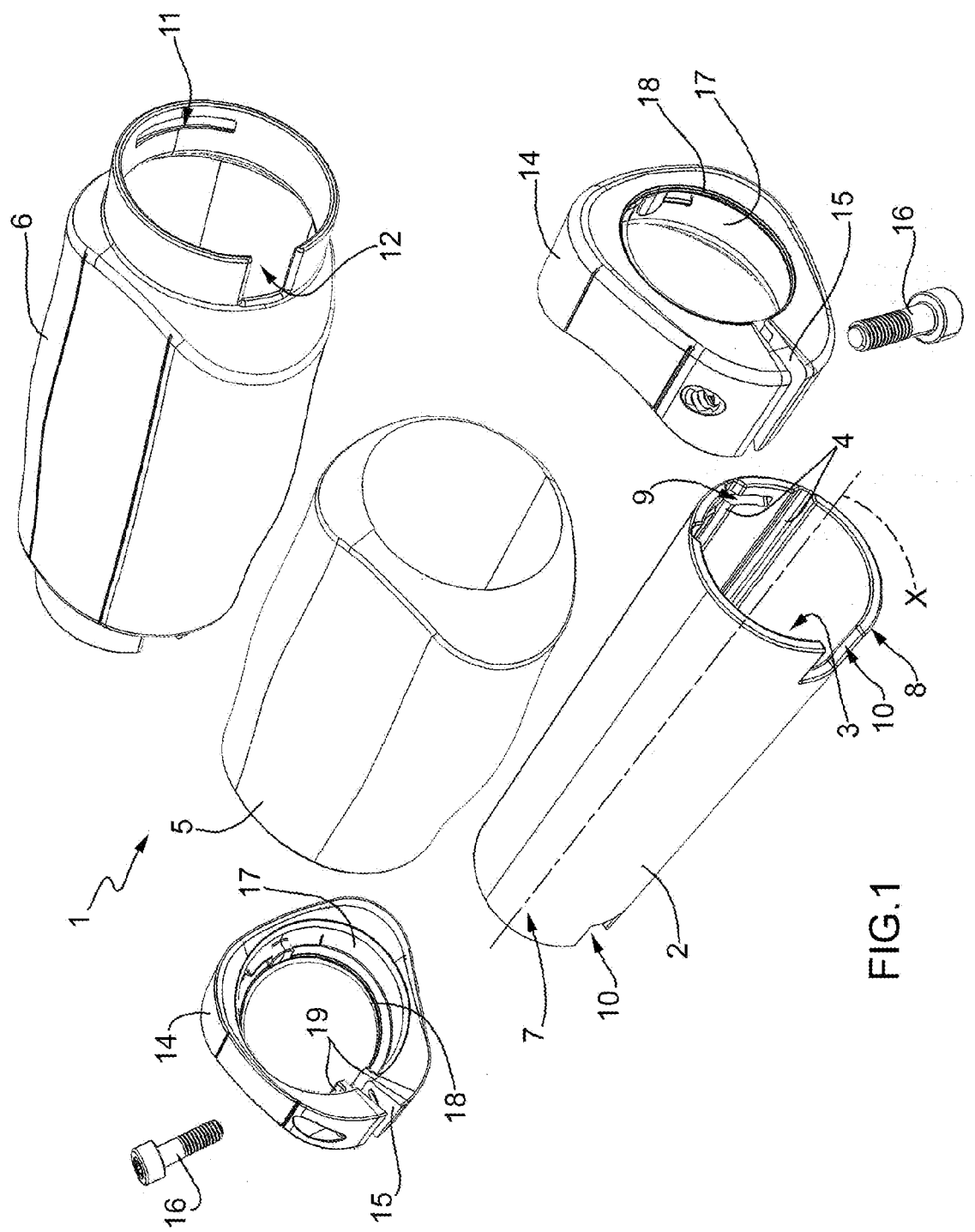
FIG. 1 is an exploded perspective view of a grip for handlebars according to the present invention.
Figure 5:
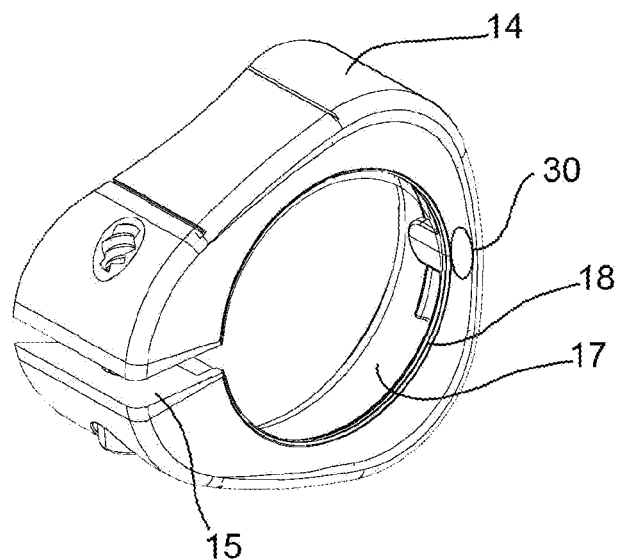
FIG. 5 illustrates an alternative embodiment of a detail of the grip according to the present invention.

For the sake of simplicity of the description, in the rest of the description, we shall refer to a grip for handlebars of bicycles, with the understanding that it can also be used for any other type of vehicle with handlebars and even for hand grips and handles of any kind, for example, for sports equipment.

With reference to the figures, a grip for handlebars of a bicycle, used in bicycles and vehicles with handlebars of various kinds, is indicated with reference numeral 1.

The grip comprises an inner body 2, made from relatively rigid material, substantially cylindrical shaped with a longitudinal axis "X", suitable for being fitted on an end of the handlebars (not illustrated) or a similar element, for example a hand grip, a handle, etc.

The inner body 2 can be made from any rigid and semirigid material, metal or plastic, for example a thermoplastic polymer.

The inner body 2 comprises a cavity 3 substantially cylindrical, open at both ends, on the inner surface of the cavity 3 there can be one or more grooves 4 suitable for positioning the grip 1 and for orienting it correctly during the various production steps, as well as promoting the positioning of the further components of the grip 1, as shall become clearer hereafter.

The body 2 also has two ends 7, 8 each equipped with a slot 9 and a recess 10, the functions of which shall be explained in greater detail in the rest of the description.

Figure 7A:
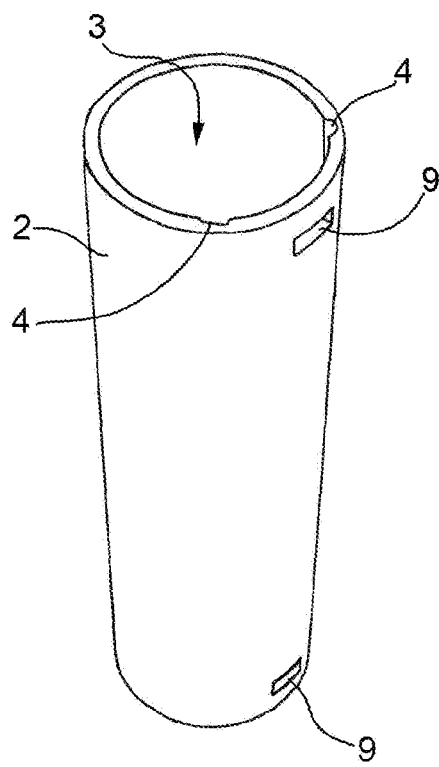
FIGS. 7A and 7B illustrate an alternative embodiment of a detail of the grip according to the present invention.

In an alternative embodiment, represented in FIG. 7A, the body 2 can also not have the recess 10.

On the outer surface of the body 2, and connected to it, there is a padding 5 made from relatively soft material, for example made from polyurethane gel, or from other materials that are suitable for this purpose. For example, materials of the non-foamed or foamed type can be used, such as thermoplastic elastomers, silicone, compact elastomeric polyurethane (PU), microcellular polyurethane, foamed ethyl vinyl acetate (EVA), etc. Such a padding 5 can also be made with continuous heterogeneous materials, such as for example mixtures of gel and cork, gel and phase-change materials, etc., as well as discontinuous homogeneous materials such as, for example, packets of microspheres free to run over one another and able to adapt perfectly to the shape of the hand and to the external stresses, a layer of gel arranged above a layer of ethyl vinyl acetate or polyurethane foam, etc.

The padding 5 can have a profile shaped so as to promote a good grip and good comfort for the user. The padding 5 can be obtained by casting the material of the padding on the body 2 in a mold (not illustrated) in which the aforementioned body 2 is housed. Once it has set, the material of the padding is connected to the body 2.

According to another version of the present invention, the material of the padding can be cast, injected, molded, etc., in a mold without the body 2 and then connected to the body 2 through other processes, for example through gluing.

The padding 5 has a longitudinal length, according to the axis "X", that is shorter than the length of the body 2, so as to leave at least one of the ends 7, 8 of the body 2 itself uncovered.

Above at least one part of the padding 5 a cover 6 is foreseen, at least partially made from thermoshrinking material, or from another suitable material, for example from a thermoformable material. The cover 6 can have a combination of thermoshrinking and/or thermoformable material and of other covering materials with special characteristics, as described in greater detail in the rest of the description.

The cover 6 has an outer surface that is suitable for providing high comfort for the user also allowing the padding 5 underneath to be protected.

The cover 6 has a longitudinal length, according to the axis "X", that is substantially equal to the length of the body 2, so as to also cover the ends 7, 8 of the body 2 that are uncovered by the padding 5. For this reason, the cover 6 has, at its ends, slots 11 and recesses 12 that are analogous to those of the ends 7, 8 of the body 2.

In an alternative embodiment, the cover 6 does not have the recesses 12 and is used in combination with the body 2 without the recesses 10.

According to one version of the present invention, the cover 6 has the initial form of a substantially cylindrical tubular sheath that is fitted on the assembly formed by the body 2 and by the padding 5. Since the material of the cover 6 is thermoshrinking, following a heating and/or cooling, the substantially cylindrical tubular sheath shrinks, i.e., it decreases its dimensions, in particular in its diameter, and takes up a shape, illustrated in the figures, corresponding to the shape of the body 2 and padding 5 assembly.

Figures 6A, 6B:
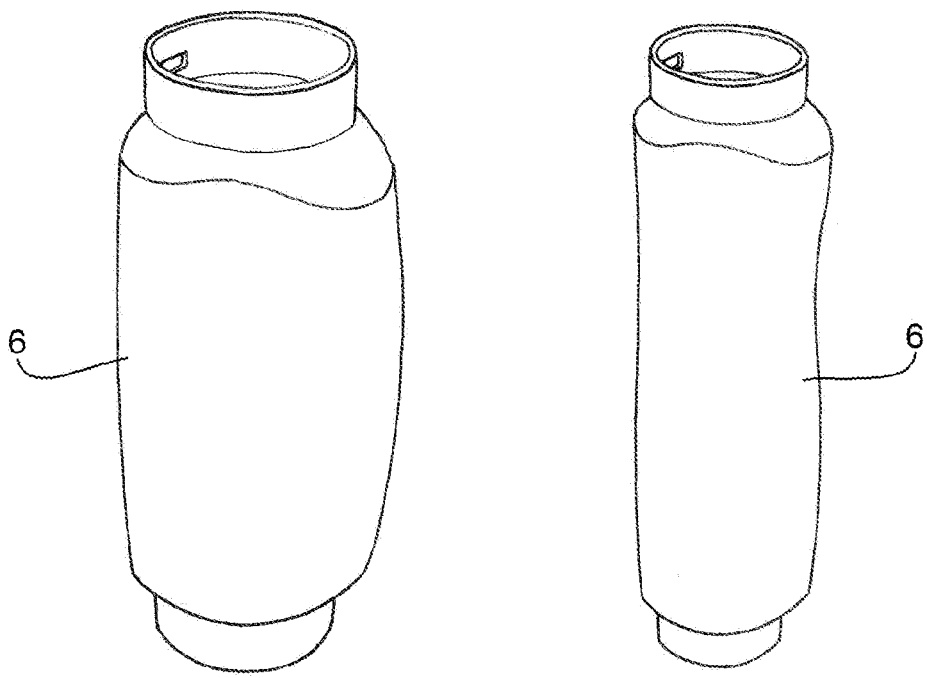
FIGS. 6A and 6B illustrate example embodiments of a detail of the grip according to the present invention.

The cover 6 can take up different configurations, so as to adapt to the different requirements of the users, as illustrated in FIGS. 6A and 6B.

The material of the thermoshrinking sheath can comprise one or more thermoplastic materials that, as an example and not for limiting purposes, can be a polyolefin, a fluoropolymer, a polyvinyl chloride (PVC), a synthetic rubber based on polychloroprene (neoprene), a silicone elastomer or a fluoropolymer elastomer (Viton, registered trademark of DuPont), or yet natural or synthetic materials such as woven or non-woven fabrics. According to another version of the present invention, the cover 6 is made from thermoformable material to which, through heat and pressure, the shape of the body 2 and padding 5 assembly, is given.

In an alternative embodiment, the cover 6 can be obtained by using a sheath made from foamed ethyl vinyl acetate coupled with an impermeable material, which could be thermoformed on the padding 5.

FIG. 2 illustrates another version of the cover 6 comprising a portion or window 13 made from transparent material, that may or may not be coupled with the thermoshrinking and/or thermoformable materials of the grip 1. Such a transparent material could have the same or similar thermoshrinking and/or thermoformable characteristics as the non-transparent material.

Thanks to this transparent window, in any case applied or formed from the cover 6, it is possible to see areas of the padding 5. Moreover, in the case in which even the padding 5 is transparent, for example a transparent gel, even areas of the outer surface of the body 2 and/or other materials and/or foams used to form the padding 5 and/or areas inside the padding 5 itself can be visible from outside. Such areas visible from outside of the padding 5 and/or of the body 2 can have prints, and/or drawings, and/or writing, and/or ornamental elements, and/or colorations, etc., which give special and identifying characteristics to the grip itself.

The grip 1 comprises at least one ring 14 for fastening to the handlebars, and in particular comprises two fastening rings 14 positioned at the end of the grip.

The fastening ring 14 comprises a notch 15 that, through locking means 16, for example screw means or equivalent means, makes it possible to reduce the inner diameter of the ring 14 itself so as to fasten it to the handlebars according to what is explained in the rest of the description.

Figure 7B:
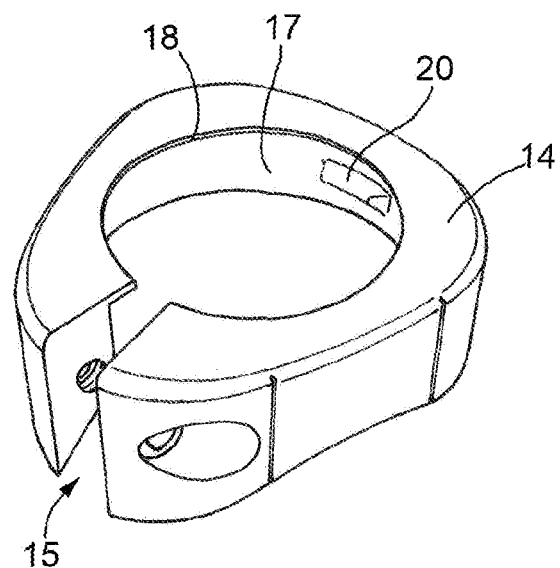

As illustrated in FIG. 7B, the fastening ring 14 comprises a first inner surface 17 with a diameter such as to couple with the ends 7, 8 of the body 2 and with the cover 6, and a second inner surface 18, with a smaller diameter, suitable for covering the end of the body 2, of the cover 6 and of the tube of the handlebars.

In an alternative embodiment, the fastening ring 14 also comprises one or more ridges 19, in particular two ridges 19 adjacent to the notch 15 that are inserted into the recess 10 of the body 2 and make it possible to angularly and axially refer the ring 14 to the body 2.

In order to further increase the fastening strength and the angular and axial reference of the body 2 with respect to the ring 14, the inner surface 17 can comprise a rib 20 that is substantially arranged along a certain arc of circumference. Moreover, the rib 20 is inserted into the slot 9 of the body 2 and/or into the slot 11 of the cover 6 suitably foreseen.

For such a purpose, the grooves 4 of the inner body 2 make it possible for the latter to flatten and slightly collapse so as to allow the insertion of the rib 20 into the slot 9 and/or into the slot 11. Such grooves 4 also act as positioners of the grip 1 and control their orientation during the various production steps, even through corresponding protuberances arranged in the casting mold that are coupled with the grooves 4, ensuring in such a way the correct orientation of the entire grip 1.

As a whole, the fastening between the grip 1 and the tube of the handlebars is very secure even though it is simple to carry out by a user.

The fastening rings 14 can be made from metal, for example steel, aluminum, etc., or from polymeric material, for example thermoplastic or thermosetting materials reinforced with fibers, balls, nanofillers, composite materials such as fiberglass, resin with carbon fibers or aramid fibers, etc.

In an alternative embodiment, the fastening rings 14, of the open type thanks to the presence of at least one notch 15 that is substantially radial and closed by the locking means 16, have thinning means, wholly indicated with reference numeral 30, in a position that is substantially diametrically opposite with respect to at least one notch 15. Such means are suitable for creating a "hinge" effect in the fastening ring 14, allowing a greater and optimal locking of the body 2 on the tube of the handlebars. In the preferred but not exclusive embodiment, illustrated in the figures, the thinning means 30 are defined by blind or through holes, which can be positioned at the rib 20 and/or at the inner surface 17 of the ring 14, both in the part facing towards the inner body 2 and towards the cover 6. It should be understood, however, that it can be foreseen for there to be any other configuration of the thinning means without for this reason departing from the scope of protection expressed by the content of the attached claims.

The grip according to the present invention can be made according to the different longitudinal lengths usually available on the market that, as an example and not for limiting purposes, can be of 90 mm, 110 mm and 130 mm.

Figure 8:
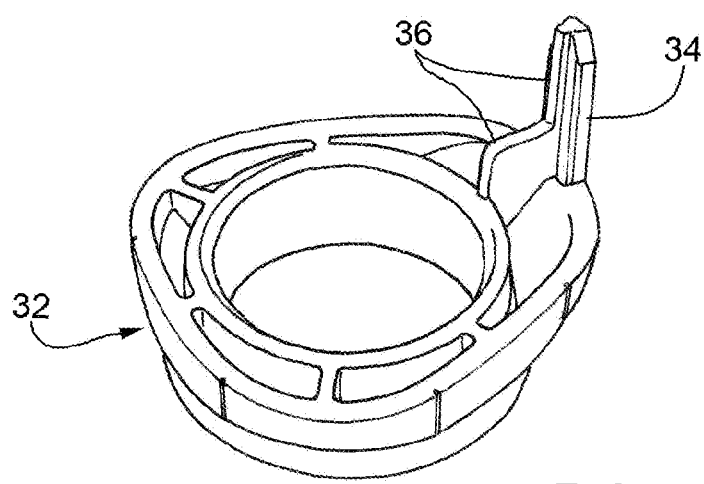
FIG. 8 illustrates an accessory that can be applied to the grip according to the present invention.
Figure 9:
FIG. 9 illustrates a schematic view of parts of a grip of the handlebars according to FIG. 1 according to the present invention.
Figure 9:
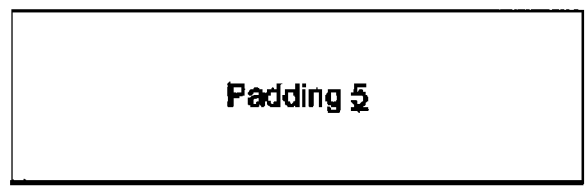
Figure 9:
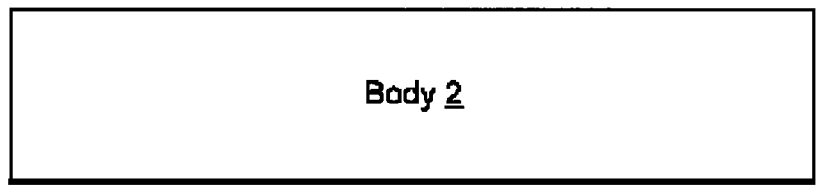

FIG. 8, moreover, illustrates an accessory that can be applied to the grip 1, such as for example an adaptor 32 for the gearshift of a bicycle and that can be coupled with the ring 14 thanks to a wing 34, possibly equipped with one or more ribbings 36, that can be inserted into the notch 15 of the ring 14. The adaptor 32 and the wing 34 can also take up other shapes and configurations without for this reason departing from the scope of protection of the claims themselves.

The present invention also concerns a method for making said grip 1.

The method for making a grip 1 equipped with a body 2, with a padding 5 and with a cover 6 in thermoshrinking and/or thermoformable material, comprises the steps of making a substantially tubular body 2, associating a padding 5 with such a body 2 and positioning a cover 6 over such a padding 5 through a heating and/or cooling step that induces a shrinking and/or a forming of the cover 6 on the padding 5.

According to one version of the method, the step of associating the padding 5 with the body 2 comprises the steps of casting and setting the material of the padding directly on the body 2. The present invention thus conceived can undergo numerous modifications and variants all covered by the scope of protection of the claims.

The invention claimed is:

1. A grip for handlebars of a bicycle or similar vehicle, comprising:
   a substantially tubular body equipped with ends and having a substantially cylindrical cavity with a longitudinal axis (X), said body being suitable for being fitted on an end of the handlebars;
   a padding made of a soft material and associated with said body;
   a cover positioned above the padding having two ends; and
   a fastening element for fastening the grip to the handlebars, wherein said cover comprises at least one part made from thermoshrinking and/or thermoformable material, so that, following a thermal variation by heating and/or cooling, a shrinking step and/or a forming step of the cover on the padding is caused, thereby said cover taking the form of the padding, and wherein said padding has a longitudinal length, according to said longitudinal axis, that is shorter than the length of the body, so as to leave at least one of the ends of the body itself uncovered, and in that said cover has a longitudinal length, according to said longitudinal axis, that is equal to the length of said body, so that the two ends of the cover are flush with each end of the body and cover the ends of said body that are uncovered by said padding.

2. The grip according to claim 1, wherein said body is made from rigid or semi-rigid material.

3. The grip according to claim 1, wherein said body comprises a slot and/or a recess positioned in at least one of the ends of the body.

4. The grip according to claim 1, wherein said body comprises at least one groove arranged on the inner surface of the cavity, said at least one groove being suitable for flattening and collapsing to ease the coupling of said body with said fastening means.

5. The grip according to claim 1, wherein said padding comprises a relatively soft material, comprising at least one element selected from the group comprising polyurethane gel, thermoplastic elastomers, silicon, compact elastomeric polyurethane (PU), microcellular polyurethane and/or foamed ethyl vinyl acetate (EVA), or said padding comprises continuous heterogeneous materials including mixtures of gel and cork and/or gel and phase-change materials and/or discontinuous homogenous materials.

6. The grip of claim 5, wherein the discontinuous homogenous materials adapt to the shape of the hand and to the external stresses and/or a layer of gel arranged above a layer of ethyl vinyl acetate and/or polyurethane foam.

7. The grip according to claim 1, wherein said padding is connected to the body through casting and subsequent setting of the material of the padding on the body.

8. The grip according to claim 1, wherein said padding is connected to the body through gluing.

9. The grip according to claim 1, wherein said padding has a profile configured to promote good grip and good comfort for the user.

10. The grip according to claim 1, wherein said padding has a longitudinal length, according to the axis (X), that is shorter than the length of the body, so as to leave at least one of the ends of the body itself uncovered, and in that said cover has a longitudinal length, according to said longitudinal axis, that is substantially equal to the length of said body, so as to also cover both ends of said body that are uncovered by said padding.

11. The grip according to claim 1, wherein said cover has an outer surface suitable for providing high comfort for the user also allowing the padding underneath to be protected.

12. The grip according to claim 1, wherein said cover comprises one or more materials, including a polyolefin, a fluoropolymer, a polyvinyl chloride (PVC), a synthetic rubber based on polychloroprene (neoprene), a silicon elastomer or a fluoropolymer elastomer and/or other natural and/or synthetic materials such as woven or non-woven fabrics.

13. The grip according to claim 1, wherein said cover comprises a portion or window made from at least partially transparent material.

14. The grip according to claim 13, wherein said transparent material has the same or similar thermoshrinking and/or thermoformable characteristics as the non-transparent material.

15. The grip according to claim 13, wherein said padding comprises at least one transparent portion including a transparent gel, so as to make it possible to see areas of the outer surface of the body and/or areas of the padding and/or inner areas of said padding.

16. The grip according to claim 1, wherein said fastening element comprises at least one fastening ring equipped with locking means.

17. The grip according to claim 16, wherein said fastening ring comprises a notch.

18. The grip according to claim 17, wherein said fastening ring comprises one or more ridges arranged adjacent to the notch and suitable for inserting into said recess of the body.

19. The grip according to claim 18, wherein the inner surface of the ring comprises a rib, said rib being foreseen to be inserted in the slot of the body and/or in the slot of the cover.

20. The grip according to claim 16, wherein said fastening ring comprises thinning means.

21. The grip according to claim 16, wherein said fastening ring comprises a first inner surface with a diameter suitable for coupling with the ends of the body and/or with the cover, and a second inner surface, with a smaller diameter, suitable for covering the end of the body and of the handlebars tube.

22. The grip according to claim 16, wherein said ring is made from metal, steel, aluminum, and/or from a polymeric material, thermoplastic and/or thermosetting materials reinforced with fibers, and/or balls and/or nanofillers and/or composite materials, fiberglass, resin with carbon fibres or aramid fibers.

23. The grip of claim 1, wherein the cover is fitted on the assembly formed by said body and by said padding and then subjected to a thermal variation by heating/and/or cooling, thereby obtaining said shrinking step and/or forming step.

24. A grip for handlebars of a bicycle or similar vehicle, comprising:
   a substantially tubular body equipped with ends and having a substantially cylindrical through cavity passing through an entire length of the tubular body and connecting the ends and having a longitudinal axis (X), said body configured for being fitted on an end of the handlebars;
   a padding made of a soft material and associated with said body;
   a cover positioned above the padding having two ends; and
   a fastening element for fastening the grip to the handlebars, wherein said cover comprises at least one part made from thermoshrinking and/or thermoformable material, so that, following a thermal variation by heating and/or cooling a shrinking step and/or a forming step of the cover on the padding is caused, thereby said cover taking the form of the padding, and wherein said padding has a longitudinal length, according to said longitudinal axis, that is shorter than the length of the body, so as to leave at least one of the ends of the body itself uncovered, and in that said cover has a longitudinal length, according to sais longitudinal axis (X), that is substantially equal to the length of said body, so that the two ends of the cover are flush with each end of the body and cover the ends of said body that are uncovered by said padding.

25. A grip for handlebars of a bicycle or similar vehicle, comprising:
   a substantially tubular body equipped with ends, each end having at least a slot and a recess and said tubular body having a substantially cylindrical cavity with a longitudinal axis (X), said body being suitable for being fitted on an end of the handlebars;
   a padding made of a soft material and associated with said body;
   a cover positioned above the padding having two ends; and
   a fastening element for fastening the grip to the handlebars, wherein said cover comprises ends, each end having at least one cover slot and at least one cover recess analogous to the slot and the recess of the tubular body, and wherein said padding has a longitudinal length, according to said longitudinal axis (X), that is shorter than the length of the body and leaves at least one of the ends of the tubular body uncovered, and wherein said cover has a longitudinal length, according to said longitudinal axis (X), that is equal to the length of said body, wherein the two ends of the cover are flush with each end of the body and covers the ends of said body that are uncovered by said padding.

* * * * *